Oct. 4, 1955 R. R. KEMMERER 2,719,909
TIME CONTROL OF CODE CHANGE IN ALTERNATING CURRENT TRACK CIRCUITS FOR CODED RAILWAY CAB SIGNALS
Filed Sept. 26, 1952
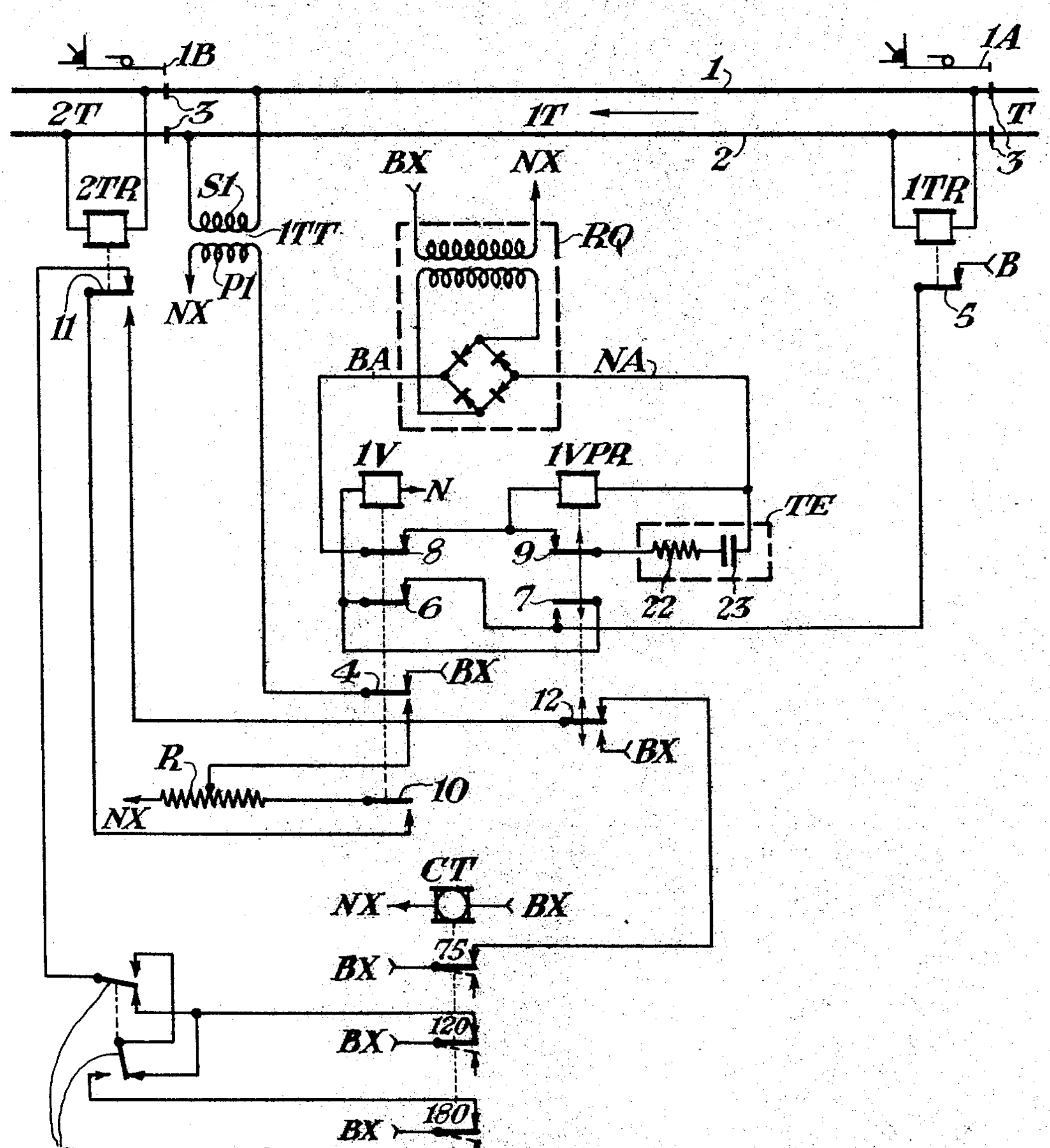
INVENTOR.
Ralph R. Kemmerer
BY W. L. Stout
HIS ATTORNEY United States Patent Office 2,719,909

Patented Oct. 4, 1955

2,719,909

TIME CONTROL OF CODE CHANGE IN ALTERNATING CURRENT TRACK CIRCUITS FOR CODED RAILWAY CAB SIGNALS

Ralph R. Kemmerer, Swissvale, Pa., assignor to Westinghouse Air Brake Company, Wilmerding, Pa., a corporation of Pennsylvania Application September 26, 1952, Serial No. 311,733

6 Claims. (Cl. 246—34)

My invention relates to a time control of code change in alternating current track circuits for coded railway cab signals. More particularly, my invention relates to an improved means of controlling, by predetermined time interval, the point in any track section at which the indication on the cab signal of a continuous indication coded cab signal system changes to a low speed or restrictive indication when the next track section in advance is occupied.

For example, in coded cab signal systems in general use, alternating current periodically interrupted at the code rates of 180, 120, and 75 times per minute is supplied to the track rails of a section to reflect clear, approach medium, and approach traffic conditions, respectively, and noncoded current or the absence of current reflects a low speed or restrictive traffic condition.

In a coded cab signal system of the type here involved, the indication shown by the cab signal is the same as was or would be shown by the last wayside signal passed by the train. When a train is approaching a wayside signal which displays a stop indication, the cab signal will normally display an approach or caution indication up to the time the train passes the stop signal unless some special means are provided to change the track code when the train is at some predetermined distance in the rear of the stop signal.

One method of providing this feature is to change the code supplied to the rails at a set time interval after the train enters the section. Since many cab signal systems supply cab signal energy to the rails only as a train approaches or enters the section concerned, a starting point for such a time interval is readily available. That is, the time interval starts when an approach relay responsive to the train entering the section is operated to apply cab signal energy to the rails. A particular method of accomplishing this is to use a front contact repeater relay of the approach control relay, said repeater relay being made slow release by a suitable timing unit. When the approach control relay is released and deenergizes the repeater relay, if the next track section in advance is occupied, the time interval before the coded cab signal energy is changed or removed from the rails is determined by the time required for the slow release repeater relay to release.

This arrangement is not entirely satisfactory because if, after a train enters the track section concerned, the rail shunt is momentarily last for any reason, the approach control relay is momentarily energized through the track relay and picked up. This reenergizes the timing unit connected in multiple with the repeater relay and the full time internal for release of said repeater relay is reestablished. When this happens, the code change for cab signals occurs too late or may not occur at all. If the momentary loss of rail shunt occurs after the code change, the approach code might be reapplied and cause the cab signal to again display a caution or approach signal. While not an unsafe condition, this would be confusing to the locomotive engineer. It should be noted that generally such loss of rail shunt is of very short duration and is not a usual occurrence.

One object of my invention is the provision of means to prevent the time delay period provided for changing a code of an alternating current track circuit after a train enters the track circuit from being reestablished, if the rail shunt is lost, until the initial time delay period has been completed. A feature of my invention in accomplishing the foregoing object is the provision of novel and improved control circuits for an approach control relay used for governing the supply of coded cab signal control current to the rails of a track section.

Another object of my invention is the provision of means to prevent code from being reapplied to the rails of a track section if the rail shunt is lost after the code change has occurred. A feature of my invention in accomplishing this object is the provision of a repeater relay having slow pickup characteristics and the including of a front contact of said repeater relay in the circuit which energizes the time element device which determines the delay in the changing of the code of the cab signal control current.

Other objects of the invention and features of novelty will be apparent from the following description, taken in connection with the accompanying drawing.

I shall describe one form of coded track circuit apparatus embodying my invention and shall then point out the novel features thereof in claims.

The accompanying drawing is a diagrammatic view showing one form of apparatus embodying my invention when applied to the wayside apparatus controlling a three-block four-indication continuous, coded cab signal system.

A stretch of railway over which traffic normally moves in the direction indicated by the arrow is formed by the usual insulated rail joints 3, with a track section 1T which is one section of a series of successive track sections. Only the section 1T and portions of the adjacent sections T and 2T are shown because this is sufficient for an understanding of my invention. The rails 1 and 2 of section 1T are bonded and included in a track circuit which comprises a track relay 1TR connected across the rails adjacent the entrance end of the section and a source of current connected across the rails adjacent the exit end of the section, the source of current being a secondary winding S1 of a track transformer 1TT, the primary winding P1 of which is supplied with current in a manner to be described hereinafter. Wayside signals 1A and 1B are shown conventionally but the apparatus for controlling these wayside signals is not shown since it forms no part of my invention and it may be of standard arrangement.

According to my invention, coded alternating current is applied to the rails of section 1T for cab signal control. Cab signal control may be of different arrangements, and it may be of the type using alternating current of a suitable frequency such as 100 cycles per second periodically interrupted at the code rate of 180, 120, and 75 times per minute to reflect clear, approach medium, and approach or caution traffic conditions, respectively. Noncoded current or no current supplied to the rails reflects low speed or restrictive cab signal indication. Since my invention is concerned with the means for supplying the 75 code current and the noncoded current, the circuits by which currents of the 180 and 120 code rate are supplied need not be described and they may be of the usual well-known arrangement.

As shown in the drawing, the apparatus is in its normal condition with the track section unoccupied. Steady alternating current energy is supplied over front contact 4 of relay 1V through track transformer 1TT to the rails and thence to relay 1TR keeping that relay in the picked up position. The approach control relay 1V is energized by current from a battery, not shown, but having terminals B and N. Positive battery B and negative battery N are common to all locations of the said signal systems. Normally, relay 1V is energized by a stick circuit extending from terminal B over front contact 5 of relay 1TR, front contact 6 of relay 1V and to negative terminal N through the winding of relay 1V. Relay 1V was originally energized and picked up over a pickup circuit extending from terminal B over front contact 5 of relay 1TR and back contact 7 of a repeater relay 1VPR, then through the relay winding to terminal N.

The repeater relay 1VPR is a direct current neutral relay provided with slow pickup characteristics in any of the known ways and is preferably provided with a relatively long pickup period. This relay is energized by energy supplied from a suitable source of direct current, and as here shown this source is a transformer-rectifier combination RQ, the positive and negative output terminals being indicated at BA and NA, respectively. The energization of relay 1VPR is further governed by a timing device or unit TE which may be of different forms and is here shown as an electrical energy storing device comprising a resistor 22 and a capacitor 23 in series.

The relay 1VPR is energized and picked up by current supplied from the source RQ, current flowing from terminal BA over front contact 8 of relay 1V and through winding of relay 1VPR to terminal NA. The timing unit TE is energized from the source BA over front contact 8 of relay 1V and front contact 9 of relay 1VPR, thence through the unit to terminal NA. The direct current source RQ is preferably a separate source provided at each location.

It is now assumed that a train approaches from the right through section T and passes signal 1A which displays a proceed indication. As soon as the train passes the insulated joints 3 at signal 1A, the track section 1T is shunted and relay 1TR is deenergized and releases. This deenergizes relay 1V which releases immediately. The release of relay 1V causes coded cab signal energy to be applied to the rails instead of steady energy. If track section 2T is assumed to be unoccupied and relay 2TR thus picked up, the circuit for cab signal energy is from terminal BX over either the 120 code frequency or the 180 code frequency contact of a code transmitter CT, of the usual form, depending upon the proceed indication displayed by signal 1B, over front contact 11 of relay 2TR, back contact 10 of relay 1V, through a portion of resistor R, back contact 4 of relay 1V, thence through track transformer 1TT to the rails of section 1T.

If we now assume that when said train enters the track section 1T, the track section 2T is occupied with track relay 2TR released and signal 1B displaying a stop indication, cab signal energy of 75 code frequency will be applied initially to the rails of the section 1T. The release of relay 1V described previously deenergizes relay 1VPR, but energy stored in the timing unit TE is discharged through the winding of relay 1VPR making the relay slow release. Coded cab signal energy is applied then over the circuit from terminal BX through the 75 code frequency contacts of the code transmitter CT over front contact 12 of relay 1VPR, back contact 11 of relay 2TR, back contact 10 of relay 1V, a portion of resistor R, over back contact 4 of relay 1V, thence through track transformer 1TT to the rails of the track section 1T. The cab signal in the train will then display an approach or caution indication. After a predetermined time established by the timing unit TE, relay 1VPR releases. Steady alternating current energy is then applied to the rails from terminal BX at back contact 12 of relay 1VPR over back contact 11 of relay 2TR, back contact 10 of relay 1V, a portion of resistor R, back contact 4 of relay 1V, through track transformer 1TT to the rails of section 1T. This causes the cab signal in said train to change and display a low speed or restrictive indication. When the said train eventually leaves the section 1T, steady energy applied over this same circuit energizes relay 1TR which picks up and the system is then returned to normal.

We will assume that the train has just entered track section 1T with track section 2T occupied and is receiving cab signal energy of 75 code as described previously so that the cab signal displays an approach or caution indication. We will further assume that the shunt of the rails by the train in section 1T is momentarily lost for any reason so that relay 1TR picks up momentarily closing front contact 5. Under these conditions the relay 1V is down so that its front contact 6 is open and since relay 1VPR, being slow release, is still up, its back contact 7 is also open and no circuit exists to energize relay 1V and cause it to pick up. If relay 1V had picked up, the timing unit TE would be fully recharged and the release of relay 1VPR would be delayed beyond this instant for a full period of the time delay. This would also delay the application of steady alternating current energy to the rails to replace the 75 code rate cab signal energy and would cause the cab signal to display an approach indication for too long a period before displaying the low speed indication. Thus, because relay 1V was not energized due to the improved design of the pickup circuit, the time delay period was not reestablished. The release of relay 1VPR will then occur at the proper time after the train has entered the track section, and the cab signal will display a slow speed indication at a sufficient distance to the rear of the "stop" wayside signal.

Let us now assume with said train in section 1T, with section 2T also occupied, and after relay 1VPR has released so that steady energy is applied to the rails and the cab signal displays a low speed indication, that a momentary loss of rail shunt occurs. Again, relay 1TR is energized and picked up momentarily. Now with relay 1VPR down and its back contact 7 closed, closing front contact 5 of relay 1TR energizes relay 1V and it picks up. Relay 1VPR is then energized over front contact 8 of relay 1V, but since relay 1VPR is a slow pickup type relay it does not pick up during the short period of time the relay 1V is picked up before the rail shunt is restored and relays 1TR and 1V are again deenergized and released. Also, since front contact 9 of relay 1VPR remains open the timing unit TE receives no energy and therefore cannot supply energy which might complete the pick up of relay 1VPR after relay 1V releases. Thus, since back contact 12 of relay 1VPR remains closed, steady alternating current energy remains applied to the rails and the cab signal in the train thus continues to display the low speed or restrictive indication.

Although I have herein shown and described only one form of apparatus embodying my invention, it is understood that various changes and modifications may be made therein within the scope of the appended claims without departing from the spirit and scope of my invention.

Having thus described my invention what I claim is:

1. In a railway signal system for controlling continuous coded cab signals in which the application of cab signal energy to the rails upon the approach of a train is governed in each track section by an approach relay controlled by the shunting of the track relay of the track circuit for the section and in which, when the train is traversing a section with the section next in advance occupied, the cab signal control code is changed to cause the cab signal to change from an approach to a low speed indication a predetermined time interval after the train enters the section, means to prevent the reestablishing of said predetermined time interval of the shunt of the track circuit of the section should be lost before the said code change, said means comprising in combination a track section, a track circuit including the section rails and a track relay which is picked up or shunted according as said section is unoccupied or occupied, an approach relay, a slow pickup slow release repeater relay, a stick circuit for said approach relay including its own front contact and a front contact of said track relay, a circuit including a front contact of said approach relay to energize said repeater relay, a pickup circuit for said approach relay including a back contact of said repeater relay and a front contact of said track relay, and a code supply circuit having connection to the rails of said section and including in series a front contact of said repeater relay and a back contact of said approach relay.

2. In combination with a railway signal system for controlling continuous coded cab signals in which the application of cab signal energy to the rails of a track section upon the approach of a train is governed by a relay controlled over a line wire from the entrance end of said section, and in which system when said train is approaching a stop wayside signal at the exit end of said section the code is changed to cause the cab signal in said train to change from an approach indication to a restrictive indication a predetermined time interval after said train enters said section, means to prevent the reenergizing of said approach control relay if the shunt of the track circuit of said section should be lost prior to said code change, said means comprising, a stick circuit for said approach control relay including a front contact of said track relay of the section and a front contact of said approach control relay, a slow pickup repeater relay having an energizing circuit including a front contact of said approach control relay, a timing unit having a first condition when energized and a second condition which it assumes in said predetermined time interval when deenergized, a circuit including said timing unit connected to said repeater relay to energize that relay for said time interval when said approach control relay is released, a pickup circuit for said approach control relay including a back contact of said repeater relay and a front contact of said track relay, and a coded energy supply circuit having connection across the rails adjacent the exit end of said section and including a front contact of said repeater relay and a back contact of said approach control relay.

3. In a railway signal system for controlling continuous coded cab signals in which the application of cab signal energy to the rails upon the approach of a train is governed in each track section by an approach relay controlled, over line wires, by the shunting of the track relay of the track circuit of the section and in which, when the train is traversing a section with the section next in advance occupied, the cab signal control code is changed to cause the cab signal to change from an approach to a low speed indication a predetermined time interval after the train enters the section, means to prevent the reestablishing of said predetermined time interval if the shunt of the track circuit of the section should be lost before said code change, and means to prevent the reapplying of the said cab signal control code to the rails of said track circuit of said section if the shunt of said track circuit should be lost after said code change; said means comprising in combination a track section, a track circuit including the rails of said section and a track relay which is picked up or shunted according as said section is unoccupied or occupied, an approach relay, a slow pickup repeater relay of said approach relay, a timing circuit means having an initial condition when energized and a second condition which it assumes in a predetermined time interval when deenergized, a pickup circuit for said approach relay including a back contact of the said repeater relay and a front contact of said track relay, a stick circuit for said approach relay including its own front contact and a front contact of said track relay, a circuit for energizing said timing circuit means including a front contact of said approach relay and a front contact of said repeater relay, a first circuit for energizing said repeater relay including a front contact of said approach relay, a second circuit including its own front contact and said timing circuit means for energizing said repeater relay for said predetermined time interval, and a code supply circuit having connection to the rails of said track section adjacent the exit end and including in series a front contact of said repeater relay and a back contact of said approach relay.

4. In a signal system for controlling continuous coded cab signals over a stretch of railway which is divided into a series of adjacent track sections, each track section being provided with a track circuit which includes a source of current, the rails of the section, and a track relay which is normally energized but which becomes deenergized in response to occupancy of the corresponding section by a train; the combination comprising in a track section, an approach relay responsive to the track relay, a repeater relay having slow pickup characteristics, a timing unit having a first condition which it assumes when energized, and a second condition which it assumes after a predetermined time interval when deenergized, a stick circuit for the said approach relay including its own front contact and a front contact of said track relay; a pickup circuit for said approach relay including a front contact of said track relay and a back contact of said repeater relay; a first circuit for energizing said repeater relay including a front contact of said approach relay; a second circuit for energizing the said repeater relay, for said predetermined time interval, including its own front contact and said timing unit; an energizing circuit for said timing unit including front contacts of said approach relay and said repeater relay, respectively; and a circuit, with connection to the rails of said section adjacent to the exit end, including a back contact of said approach relay, a front contact of said repeater relay, said source of current, and contacts of a code transmitter for applying coded cab signal energy to said track circuit.

5. In combination with a railway signal system for controlling continuous coded cab signals, in which the coded cab signal energy is applied to the track circuit of a section only upon the entrance of a train into said section; with a code change at a predetermined time interval after said train enters said section, if the track section next in advance is occupied, to cause the cab signal in said train to change the indication displayed from caution or approach to low speed or restrictive indication; means to prevent fully reestablishing said predetermined time interval before said code change if a momentary loss of rail shunt occurs after said train enters said section, and means to prevent reapplying to the track circuit coded cab signal energy such as to cause said cab signal to again display an approach or caution indication if said rail shunt is lost momentarily after the said code change has occurred; said means comprising a track circuit for said track section including the rails of said section, a source of current, and a track relay responsive to the occupancy or nonoccupancy of said section by a train; an approach relay responsive to said track relay, a repeater relay with slow pickup characteristics, a timing unit consisting of a resistor and a capacitor in series, which are at times connected in multiple with a winding of said repeater relay; said timing unit having a first condition which it assumes when energized and a second condition which it assumes after said predetermined time interval when deenergized, a stick circuit for said approach relay including its own front contact and a front contact of said track relay, a pickup circuit for said approach relay including a front contact of said track relay and a back contact of said repeater relay, an energizing circuit for the timing unit including front contacts of said approach relay and said repeater relay, a first circuit to enargize said repeater relay including a front contact of said approach relay, a second circuit to energize said repeater relay for said predetermined time interval including its own front contact and said timing unit; a circuit for applying coded cab signal energy to the rails, connected to said track section adjacent the exit end and including said source of current, a code following contact, a back contact of said approach relay, and a front contact of said repeater relay; and a circuit for applying noncoded energy to the rails, connected to said track section adjacent the exit end and including said source of current, and back contacts of said approach and repeater relays.

6. In combination, a track section having a normal direction for traffic; a track circuit for said section including the section rails, a secondary winding of a track transformer connected across the rails adjacent the exit end of said section and a track relay connected across the rails adjacent the entrance end of said section; said track relay being picked up when alternating current is supplied to a primary winding of said transformer and released when the section rails are shunted, an approach control relay, a slow pickup repeater relay, a timing unit including a resistor and a capacitor in series, a coder having a contact which is operated at a given code rate, a pickup circuit for said approach control relay including a front contact of said track relay and a back contact of said repeater relay, a stick circuit for said approach relay including its own front contact and a front contact of said track relay, means including a front contact of said approach relay to energize said repeater relay; means including a direct current source, a front contact of said approach relay, and a front contact of said repeater relay connected to said timing unit to charge said capacitor; means including a front contact of said repeater relay to connect said timing unit to said repeater relay to energize said repeater relay for a given time interval by the discharge of the capacitor when said approach relay is released; a first supply circuit connected to said transformer primary winding and including the source of alternating current, said coder contact, a front contact of said repeater relay and a back contact of said approach relay; and a second supply circuit connected to said transformer primary winding and including said alternating current source, a back contact of said repeater relay and a back contact of said approach relay.

References Cited in the file of this patent

UNITED STATES PATENTS

| | | |
|---|---|---|
| 2,034,533 | Parrill et al. | Mar. 17, 1936 |
| 2,049,399 | Reichard | July 28, 1936 |